United States Patent [19]

Messier

[11] Patent Number: 5,705,990
[45] Date of Patent: Jan. 6, 1998

[54] MULTIPLE SWITCH PAD

[76] Inventor: Albert J. Messier, 152 Mendon St., Blackstone, Mass. 81504

[21] Appl. No.: 234,368

[22] Filed: Apr. 28, 1994

[51] Int. Cl.⁶ .................................................. G08B 21/00
[52] U.S. Cl. ........................ 340/666; 340/665; 340/693; 340/573; 200/95 R; 200/86 R
[58] Field of Search ................................ 340/666, 667, 340/665, 693, 573; 200/85 R, 85 A, 86 R, 86 A, DIG. 35; 341/20, 34

[56] References Cited

U.S. PATENT DOCUMENTS

| | | | |
|---|---|---|---|
| 2,138,549 | 11/1938 | LaBell | 200/86 R |
| 3,485,977 | 12/1969 | Gowe | 20/96 R |
| 3,622,723 | 11/1971 | Fischel | 200/86 R |
| 3,732,384 | 5/1973 | Fischel | 200/86 R |
| 3,867,595 | 2/1975 | Ramsey et al. | 200/86 R |
| 3,894,206 | 7/1975 | Suzuki et al. | 340/67 |
| 4,067,005 | 1/1978 | Levy et al. | 340/665 |
| 4,463,232 | 7/1984 | Takakuwa | 20/86 R |
| 4,476,461 | 10/1984 | Carubia | 340/667 |
| 4,551,713 | 11/1985 | Aossey | 340/573 |
| 4,603,241 | 7/1986 | Nardi | 200/86 R |
| 4,638,307 | 1/1987 | Swartout | 340/667 |
| 4,806,713 | 2/1989 | Krug et al. | 340/667 |
| 5,120,980 | 6/1992 | Fontaine | 340/667 |
| 5,235,325 | 8/1993 | McCaughan, Jr. | 340/693 |

*Primary Examiner*—Jeffery Hofsass
*Assistant Examiner*—Benjamin C. Lee

[57] ABSTRACT

A low voltage switch pad that is placed outside an entrance door on a car seat or under a car floor mat, allowing a pet or person to activate a bell buzzer or a car warning device. This relates to providing a way for a pet to signal its owner eliminating long waiting periods at the door. It also provides a protection device when it is concealed on the seat of an automobile or under car floor mat. Other objects of the invention is to provide a multiple switch pad that is simple in design easy to build inexpensive to manufacture easy to use and is efficient in operation. These and other objects will become apparent upon the study of the following specifications.

3 Claims, 2 Drawing Sheets

MULTIPLE SWITCH PAD

Figure 2:
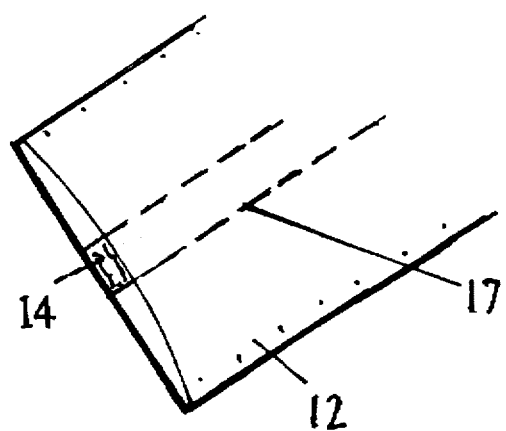

According to this invention multiple switch pad 10 consists of a base section 11 made of rigid material of wood and a flexible top 12 made of plastic sheathing, and narrow spacings 13 to increase the resiliency factor of the material 12 that is slightly wider than base section 11 to produce a spacing between the center of base 11 and top 12 as shown in FIG. 2 A strip of aluminum electric conducting tape 14 is fastened to the center of base 11. A strip of aluminum tape is also secured to top 12 when made with plastic and also with base 11. An electric contact is produced when the top section 12 and base 11 make contact. Electrical conducting wire leads 15 are connected to low voltage devices. Alumimun strips 17 are not used when top 12 is made of aluminum.

Figure 1:
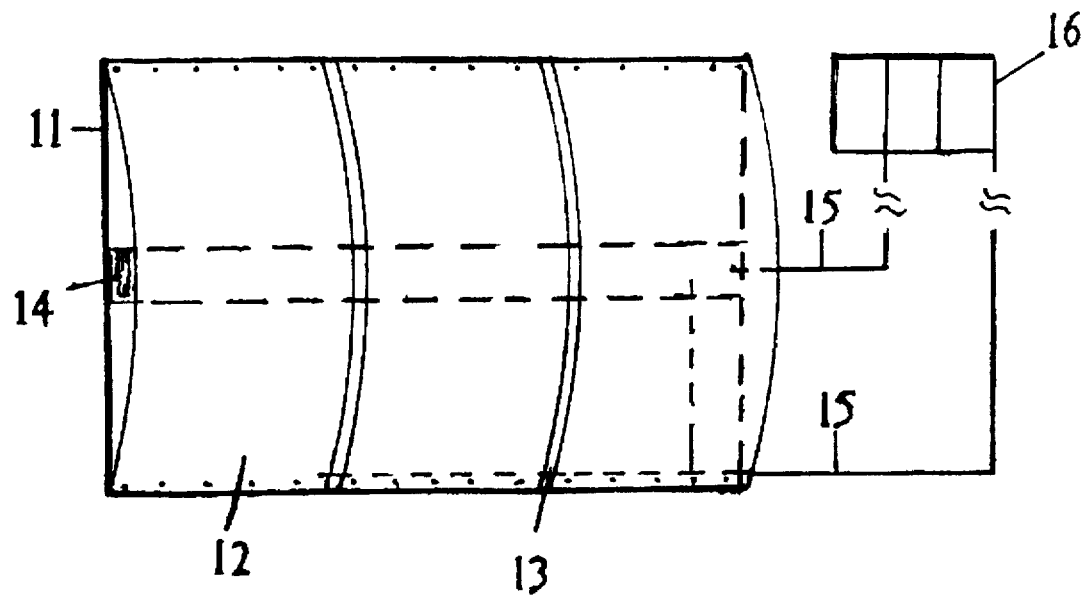
Figure 3:
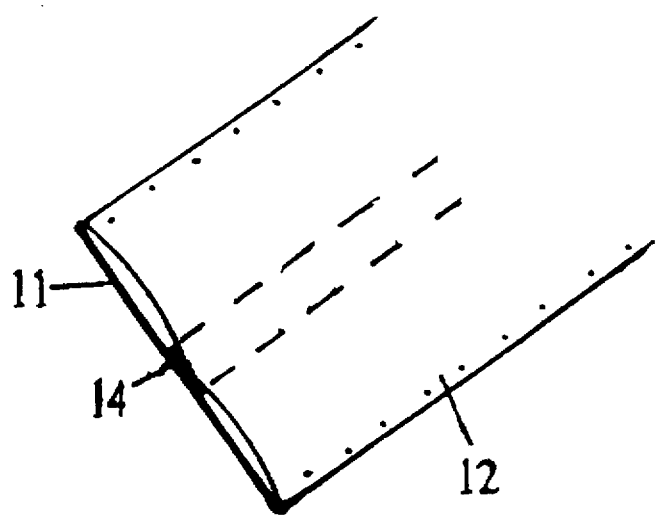
Figure 4:
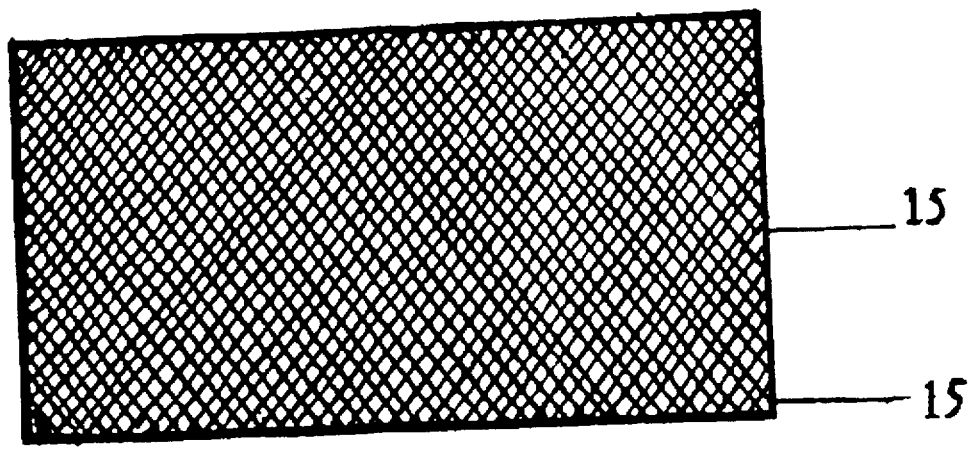

FIG. 1 is a prespective view of the invention.
FIG. 2 is an end view of base 11 and top 12.
FIG. 3 detailing the device in a signal mode.
FIG. 4 view of a finished product.

I claim:

1. A multiple switch pad having contacts to be closed upon either a pet or a person walking over it to activate a warning device, comprising: a firm base section and a resilient flexible top section having a width greater than the base section, the base section is constructed with wood and the top section being constructed with flexible plastic, the interior surfaces of the sections of the pad have electric conducting aluminum tape strips installed along the center line of both sections, and the sections are joined together only on both side edges in the direction of the aluminum tape strips so that the wider flexible top section creates an arched clearance with the firm base section, the electrical action of the switch pad is accomplished by application of either a light or heavy pressure to any part of the top section by a pet or a person walking over the pad.

2. A multiple switch pad having contacts to be closed upon either a pet or a person walking over it to activate a warning device, comprising: a firm base section made of plastic and a resilient flexible top section having a width greater than the base section, the top section made of aluminum having narrow spaced slots cut into the aluminum top section to increase its flexibility, and a strip of aluminum tape installed to the interior surface of the base section along the center line of the sections; and the sections are joined together only on both side edges along the direction of the aluminum tape strip so that the wider flexible top section creates an arched clearance with the firm base section; the electrical action of the switch pad is accomplished by application of either a light or heavy pressure to any part of the top section by a pet or a person walking over the pad.

3. A multiple switch pad as in claim 1 or claim 2, having wire leads connected to both top and base sections for connection to the warning device.

* * * * *